(12) United States Patent
Oshima et al.

(10) Patent No.: US 10,599,157 B2
(45) Date of Patent: Mar. 24, 2020

(54) AUTONOMOUS MOVEMENT SYSTEM

(71) Applicant: Doog Inc., Ibaraki (JP)

(72) Inventors: Akira Oshima, Ibaraki (JP); Hiroyasu Kuniyoshi, Ibaraki (JP)

(73) Assignee: Doog Inc. (JP)

( * ) Notice: Subject to any disclaimer, the term of this patent is extended or adjusted under 35 U.S.C. 154(b) by 335 days.

(21) Appl. No.: 15/580,527

(22) PCT Filed: Jun. 10, 2015

(86) PCT No.: PCT/JP2015/067372
§ 371 (c)(1),
(2) Date: Dec. 7, 2017

(87) PCT Pub. No.: WO2016/199312
PCT Pub. Date: Dec. 15, 2016

(65) Prior Publication Data
US 2018/0164829 A1 Jun. 14, 2018

(51) Int. Cl.
*G05D 1/02* (2020.01)
*A61G 5/04* (2013.01)
*A61G 5/10* (2006.01)

(52) U.S. Cl.
CPC .............. *G05D 1/0244* (2013.01); *A61G 5/04* (2013.01); *A61G 5/043* (2013.01); *A61G 5/10* (2013.01);
(Continued)

(58) Field of Classification Search
CPC .... G05D 1/0244; G05D 1/0248; G05D 1/024; G05D 1/0236; G05D 2201/0206;
(Continued)

(56) References Cited

U.S. PATENT DOCUMENTS 4,556,940 A * 12/1985 Katoo .................... G05D 1/027
180/168
4,727,492 A * 2/1988 Reeve .................. G05D 1/0272
180/169
(Continued)

FOREIGN PATENT DOCUMENTS

JP          S5962917 A     4/1984
JP          S59205615 A    11/1984
(Continued)

OTHER PUBLICATIONS

Japanese Office Action for JP 2017-523082 dated Aug. 20, 2019.
Japanese Office Action for JP 2017-523082 dated May 28, 2019.

*Primary Examiner* — Jaime Figueroa
(74) *Attorney, Agent, or Firm* — St Onge Steward Johnston & Reens LLC

(57) ABSTRACT

A movable object includes a sensing device for detecting traveling-route reflector on a travel surface so that a region outside a floor projection region of the movable object, in particular the traveling-route reflector forward, can be detected. Detecting the traveling-route reflector across a wide range of areas allows traveling control, such as gradual deceleration before entering a curve, speed regulation based on a turning radius at the curve so that centrifugal force on a rider or load is not too great. Also the movable object can detect a branch point or an intersection beforehand, decelerate, and notify the user for user's instruction regarding the traveling direction. Furthermore, for a movable object autonomously traveling with an item mounted thereon, a single sensing device detects the traveling-route reflector and also serves as a safety sensor for avoiding collision with any other objects therearound.

11 Claims, 17 Drawing Sheets

(52) U.S. Cl.
CPC .......... *A61G 5/1051* (2016.11); *G05D 1/024* (2013.01); *G05D 1/0236* (2013.01); *G05D 1/0248* (2013.01); *A61G 2203/14* (2013.01); *A61G 2203/16* (2013.01); *A61G 2203/20* (2013.01); *A61G 2203/22* (2013.01); *A61G 2203/72* (2013.01); *G05D 2201/0206* (2013.01)

(58) Field of Classification Search
CPC .......... A61G 5/10; A61G 5/04; A61G 5/1051; A61G 5/043; A61G 2203/14; A61G 2203/72; A61G 2203/16; A61G 2203/22; A61G 2203/20
USPC ...................................................... 701/1, 23
See application file for complete search history.

(56) References Cited

U.S. PATENT DOCUMENTS

| | | | |
|---|---|---|---|
| 4,790,402 A * | 12/1988 | Field .................... G01S 17/936 | 180/169 |
| 4,796,198 A * | 1/1989 | Boultinghouse ........ G01S 17/06 | 180/167 |
| 5,005,128 A * | 4/1991 | Robins .................... G01S 17/06 | 180/167 |
| 5,367,458 A * | 11/1994 | Roberts ................. G01C 15/002 | 180/169 |
| 8,849,494 B1* | 9/2014 | Herbach ............... B60W 30/00 | 701/24 |
| 9,008,890 B1* | 4/2015 | Herbach ................. G01C 21/34 | 701/26 |
| 9,097,800 B1* | 8/2015 | Zhu ........................ G01S 13/865 | |
| 9,222,355 B2* | 12/2015 | Paterson ................. E21F 17/18 | |
| 2014/0032012 A1* | 1/2014 | Joshi ...................... G01S 13/865 | 701/1 |

FOREIGN PATENT DOCUMENTS

| | | |
|---|---|---|
| JP | S61182111 A | 8/1986 |
| JP | H01284908 A | 11/1989 |
| JP | H0934548 A | 2/1997 |
| JP | 2004086453 A | 3/2004 |
| JP | 2009110251 A | 5/2009 |
| JP | 2010015360 A | 1/2010 |
| JP | 2011134226 A | 7/2011 |
| JP | 2014130404 A | 7/2014 |

* cited by examiner

FIG.14
(a)
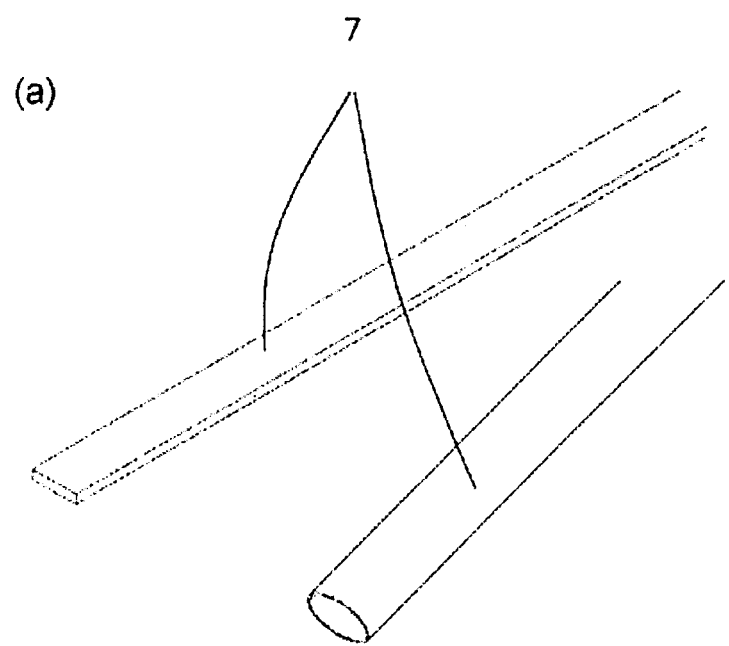
(b)
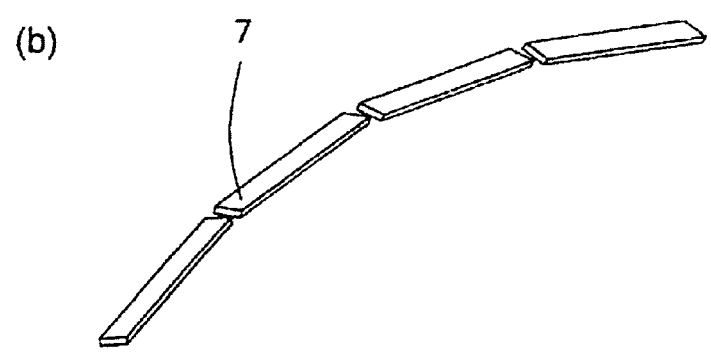

AUTONOMOUS MOVEMENT SYSTEM

TECHNICAL FIELD

The present disclosure relates to a movable object that moves along a predetermined traveling route, transporting a person or an item. Examples of the movable object include an electric wheelchair, a crawler robot, an omnidirectionally-movable vehicle using omnidirectional wheels, and the like. The present disclosure particularly relates to a configuration of a movable object that travels autonomously without the need of manipulation along a route prearranged on the ground.

BACKGROUND ART

Autonomous movement technologies have conventionally been used for conveyance of items within factories and the like. For example as described in Unexamined Japanese Patent Application Kokai Publication No. 2004-86453 (Patent Literature 1), an automated guided vehicle configured to travel along an intended traveling route by utilizing magnetic tape on the ground and a magnetic sensor disposed on the bottom of the vehicle is used in factories, warehouses, and the like. The automated guided vehicle disclosed in Unexamined Japanese Patent Application Kokai Publication No. 2004-86453 (Patent Literature 1) can detect a branch point along a traveling route. Moreover, Unexamined Japanese Patent Application Kokai Publication No. 2011-134226 (Patent Literature 2) discloses a movable object including a scanner-type laser distance sensor that performs diagonally-downward scanning to detect obstructions in a traveling direction.

SUMMARY OF INVENTION

A conventional technology-applied movable object that autonomously travels with a person riding thereon lacks consideration for ride comfort for the user. In addition, such a movable object lacks consideration for prompting the user to determine which route to proceed at a branch point, an intersection, or the like, and also lacks consideration for semi-autonomous movement. For example, when a user rides a conventional technology-based movable object, the user may experience discomfort from a great centrifugal force created whenever the movable object does not sufficiently decelerate while turning through a curve. Improving the user's ride comfort requires control of speed as well as acceleration and deceleration in the route traveling, and also requires control taking into account the centrifugal force at a curve and the like. Furthermore, a movable object that autonomously travels with an item loaded thereon also requires a safety sensor for avoiding collision with any other objects therearound, in addition to the sensor disposed on the bottom of the vehicle.

To solve the above-described problems, the present disclosure constructs an autonomous movement system allowing a movable object to travel autonomously, comprising: traveling-route reflector arranged on a travel surface; and a sensing device to detect the traveling-route reflector from a region outside a floor projection region of the movable object, wherein based on information regarding the traveling-route reflector detected by the sensing device, the autonomous movement system controls the movable object so that the movable object travels along the traveling-route reflector.

As the movable object, for example, an electric wheelchair equipped with a motor can be used. As represented by an electric motor, the motor is able to control forward rotation and counter rotation, and allow wheels, crawlers, and/or the like to rotate so that the movable object can move. The movable object has two motors for individually controlling two respective wheels disposed on the movable object, one on the right side and one on the left side. Thus the movable object can, for example, move forward, move backward, turn a curve, and perform in-place turn. The movable object may also be configured to travel through user's manipulation in addition to traveling autonomously with the user riding thereon. Furthermore, the movable object may be an automobile equipped with a steering mechanism and the like, and the present disclosure is not limited by the type of the movable object.

The movable object is configured to, when traveling autonomously, travel along the traveling-route reflector arranged on a travel surface. The traveling-route reflector may be, for example, a specific colored line or a line made of a retroreflective material. The traveling-route reflector may be a continuous line having a branch point or an intersection. The traveling-route reflector may not necessarily be a line, and may include a sequence of points. Alternatively, the traveling-route reflector may be reflector using infrared rays.

The movable object is equipped with a sensing device for detecting the traveling-route reflector on a travel surface. For example, a scanner-type laser distance sensor can be used. In the present disclosure the sensing device is configured to detect a region outside a floor projection region of the movable object, in particular the traveling-route reflector located forward of the floor projection region. When the scanner-type laser distance sensor is used, the laser is directed, for example, diagonally downward in the forward direction of the movable object, instead of directly downward. Such an arrangement allows detection of the traveling-route reflector located forward of the floor projection region of the movable object. The present disclosure constructs an autonomous movement system that controls traveling of the movable object based on the traveling-route reflector detected by the sensing device and located outside the floor projection region of the movable object including a forward region. The conventional technology detects the inside of the floor projection region, which is directly below the movable object. In contrast, the autonomous movement system according to the present disclosure can detect and recognize the traveling-route reflector across a wide range of areas outside the floor projection region.

According to the present disclosure, a movable object that autonomously travels with a user riding thereon is equipped with a sensing device for detecting traveling-route reflector across a wide range of areas, thereby being capable of providing an autonomous movement system with improved ride comfort. The detection of the traveling-route reflector across a wide range of areas allows achievement of traveling control, such as gradual deceleration prior to entering a curve, speed regulation based on the turning radius at the curve so that the centrifugal force is not too great, and the like. Furthermore, the movable object can detect a branch point or an intersection in advance, reduce the speed, and notify the user for prompting the user to instruct which direction to proceed. Furthermore, for a movable object that autonomously travels with an item loaded thereon, a single sensing device detects the traveling-route reflector and also serves as a safety sensor for avoiding collision with any other objects therearound. This would expectedly result in cost reduction.

BRIEF DESCRIPTION OF DRAWINGS

FIG. 14 is an illustration of examples of traveling-route reflector with a band-like shape and a tubular shape (Embodiment 1);

DESCRIPTION OF EMBODIMENTS

Embodiment 1

Figure 1:
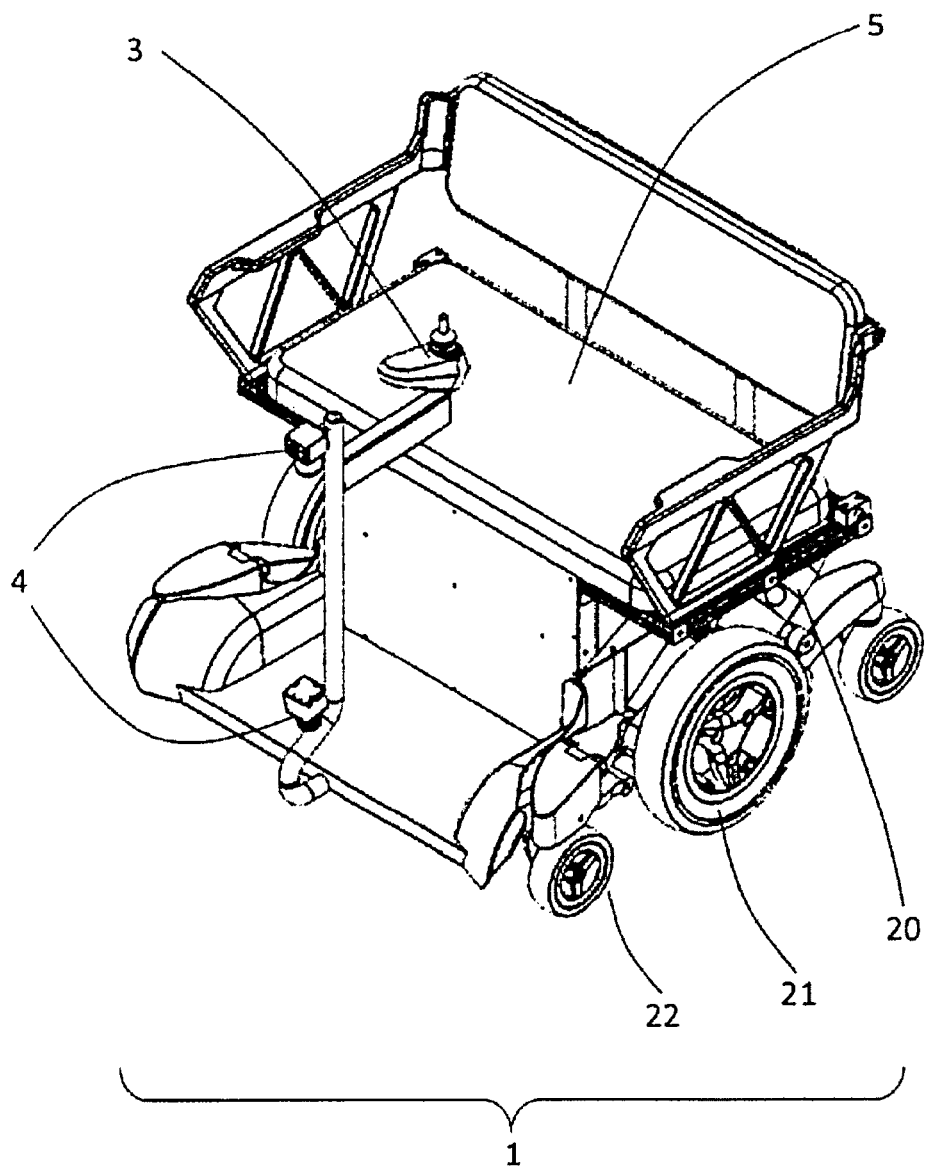
FIG. 1 is an exterior view of a main body of a movable object (Embodiment 1)
Figure 2:
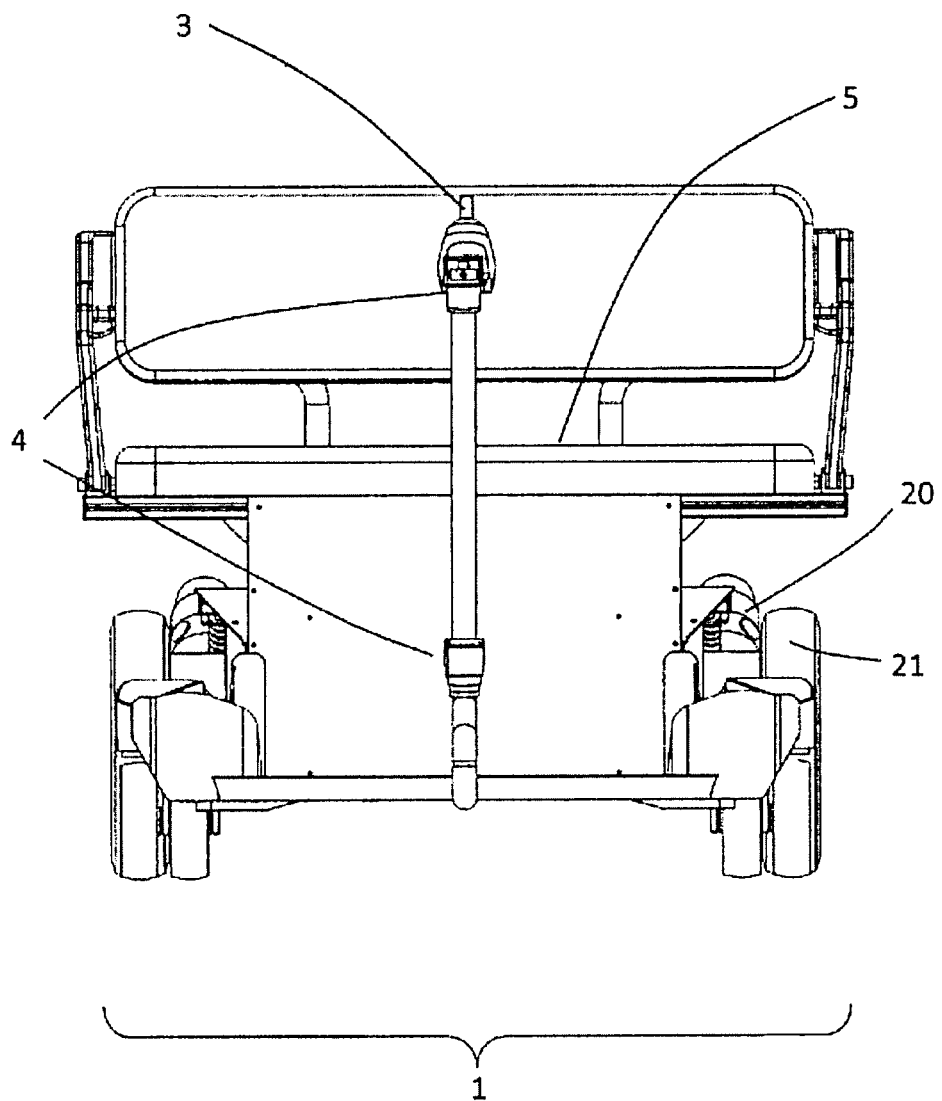
FIG. 2 is a front view of the main body of the movable object (Embodiment 1)

A movable object according to a first embodiment of the present disclosure is described with reference to FIGS. 1-7. First, a main body of the movable object according to the present embodiment is described with reference to FIGS. 1-3. FIG. 1 is an exterior view of an electric wheelchair, which is a type of the movable object. FIG. 2 is a front view of the movable object, and FIG. 3 is a left side view of the movable object.

Figure 3:
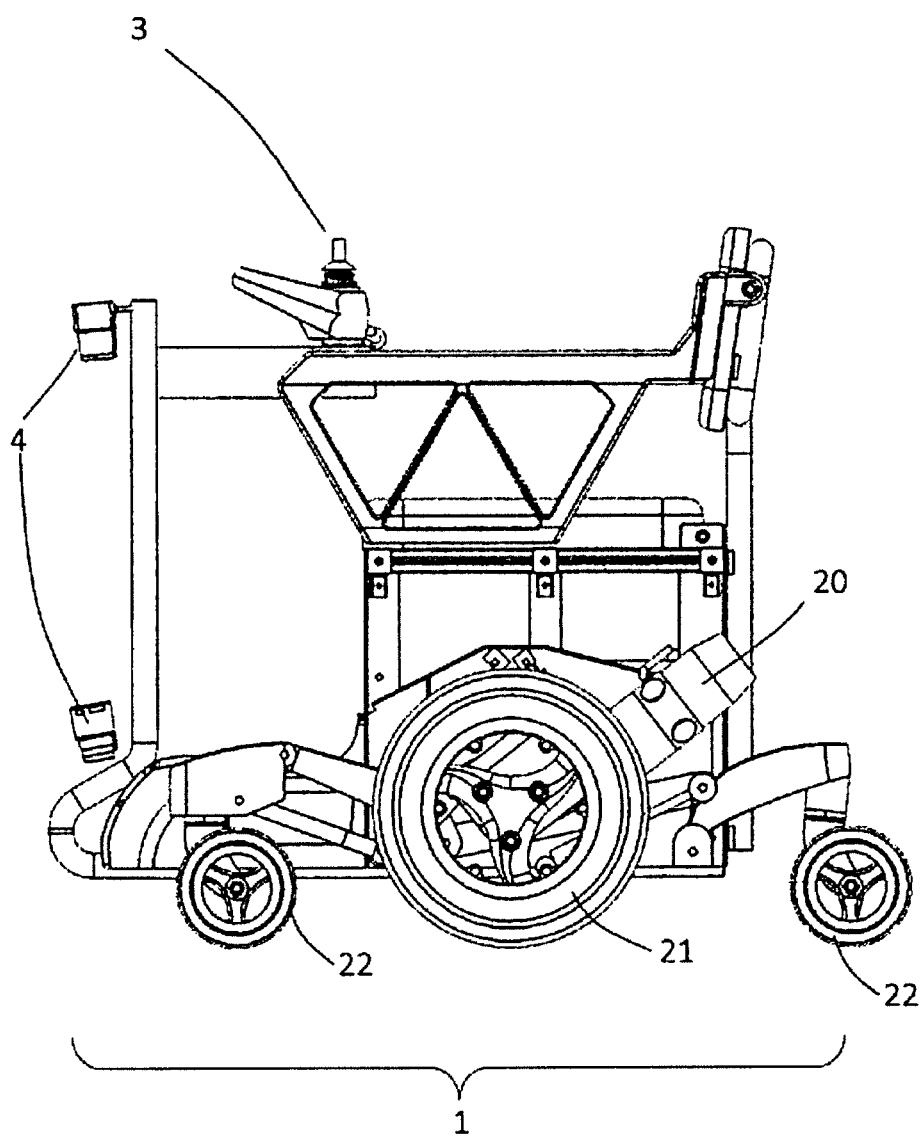
FIG. 3 is a left side view of the main body of the movable object (Embodiment 1)

The reference sign 1 in FIGS. 1-3 denotes an electric wheelchair-type movable object according to the present embodiment. The reference sign 5 in FIG. 1 denotes a seat for a user. The movable object 1 includes drive wheels 21, casters 22, and motors 20 for rotating the drive wheels 21. The motors 20 are electric motors in the present embodiment. Two electric motors, one on the right and one on the left side, are installed so as to respectively drive the two drive wheels 21 that are opposed to each other in the horizontal direction. Through their respective deceleration mechanisms, the electric motors allow the two drive wheels 21 to rotate forward, rotate backward, brake by shorting between terminals, and freely move by opening between terminals. The drive wheels 21 are driven so that the movable object 1 can, for example, move forward, move backward, turn a curve, and perform an in-place turn. The motors 20 may drive crawlers instead of the drive wheels. The use of crawlers enhances trafficability, thus enabling the movable object 1 to travel on uneven terrain and the like. Moreover, multiple drive wheels that are omnidirectionally movable may be employed. The use of omnidirectionally-movable drive wheels enables movement in the lateral direction, and the like. Furthermore, a lock structure including an electromagnetic brake and/or a lever mechanism, may be arranged near each motor 20. Also, the movable object 1 may be an automobile or the like, which is equipped with a steering wheel, and the present invention is not limited by the type of the movable object.

Figure 4:
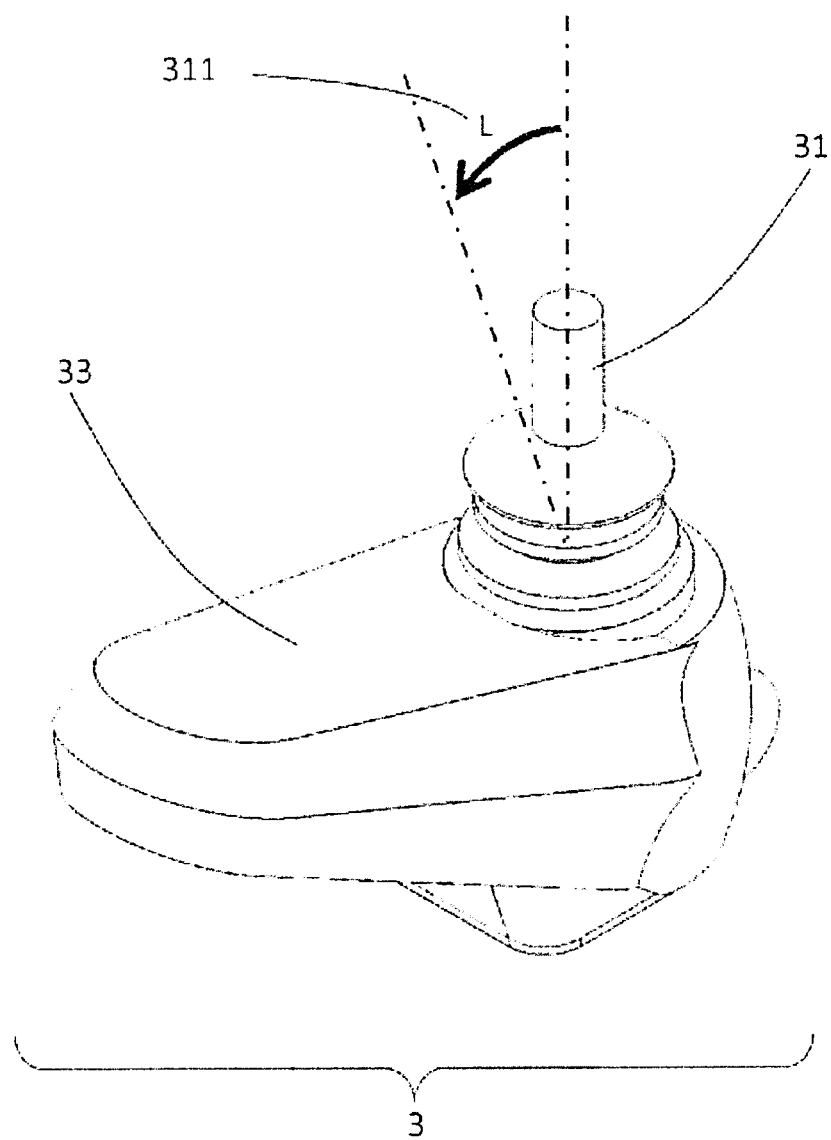
FIG. 4 is an exterior view of a joystick (Embodiment 1)

In the present embodiment the movable object 1 is configured to be able to perform both autonomous traveling along traveling-route reflector and user-controlled traveling through user's manipulation. Also, the movable object 1 may be configured, for example, to autonomously travel based on a map and to follow another movable object. The reference sign 3 in FIGS. 1-3 denotes a joystick, which is used as a manipulation device in the present embodiment. Through the tilt angle and tilt direction of the joystick 3, the user can provide instructions to the movable object regarding the desired travel direction and speed. Also, a non-illustrated operation button and the like are provided so that the user can set a speed mode from among multiple speed modes, and can further select, in each of the modes, a maximum speed, an acceleration level, and the like. The manipulation device may be a touchscreen tablet device that enables manipulation through touch. Manipulation may be performed using a device for detecting user's legs, face, and/or eyes, or using a lever or the like held in the users mouth. FIG. 4 illustrates the details of the joystick 3 used as a multidimensional input device in the present embodiment. The joystick 3 includes a lever 31 and a display operation unit 33 as main components. The display operation unit 33 displays, for example, the state of the mobile object and the currently-applied speed mode, and also enables a setting operation and other operations. The user controls the travel direction and speed of the movable object by tilting the lever 31. The reference sign 311 denotes a tilt angle L that is formed when the lever 31 is tilted, and the tilt angle L is restricted within a predetermined movable range of the lever 31. Also, the manipulation device may be a device including a steering wheel as provided in an automobile, and the like, and the present disclosure is not limited by the type of the manipulation device.

Figure 5:
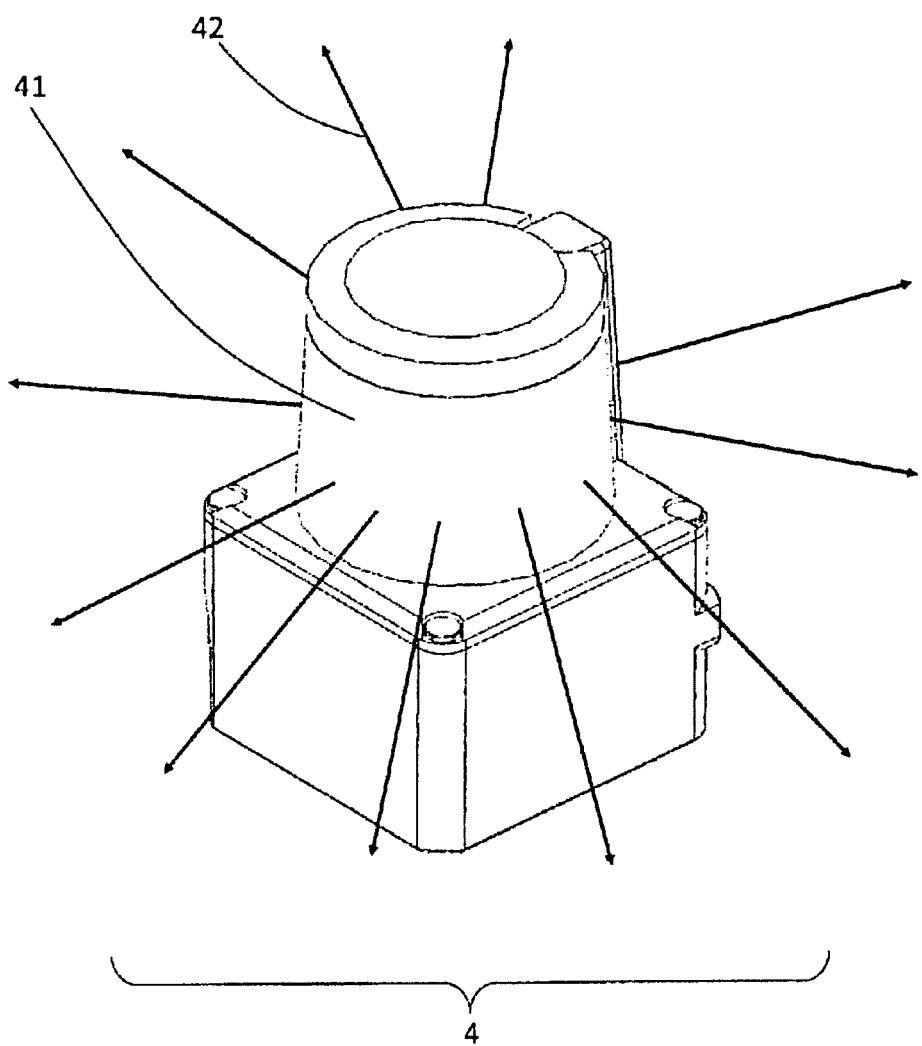
FIG. 5 is an exterior view of a scanner-type laser distance meter (Embodiment 1)

In the present embodiment a scanner-type laser distance sensor is disposed as a sensing device near a front center portion of the movable object. The reference sign 4 in FIGS. 1-3 denotes the scanner-type laser distance sensor used as the sensing device. FIG. 5 is an exterior view of the scanner-type laser distance sensor 4. As illustrated in FIG. 5, a light emitter disposed inside an optical window 41 of the sensor emits a laser 42 in a scanning manner, and a light receiver inside the optical window 41 receives the laser reflected from the detection object. The sensing device processes therein a signal transmitted from the light receiver, thereby being capable of measuring the intensity of the received light and the distance from the detection object.

Information on the distance and information on the received-light intensity are output together with information on the emission angle of the laser. The sensor repeats scanning, thereby performing detection continually at a predetermined time interval. In the present embodiment this scanner-type laser distance sensor is used to detect traveling-route reflector arranged on a travel surface. Also, the sensing device may be a camera that can measure a distance and received-light intensity through emission and reception of light, or may be a three-dimensional scanner-type laser distance sensor. Thus the present disclosure can be applied to any types of sensors capable of measuring a distance and received-light intensity through emission and reception of light.

Figure 6:
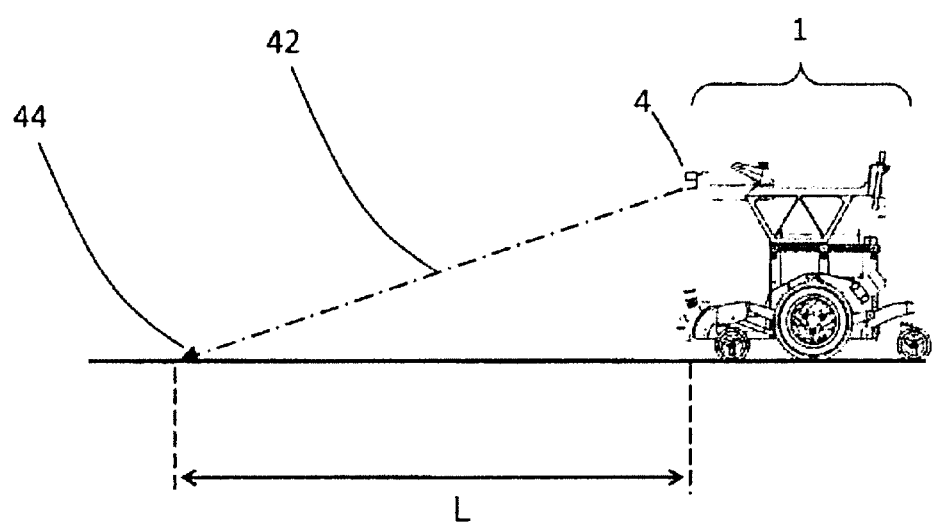
FIG. 6 is a schematic view of a position detected by the scanner-type laser distance meter (Embodiment 1)
Figure 16:
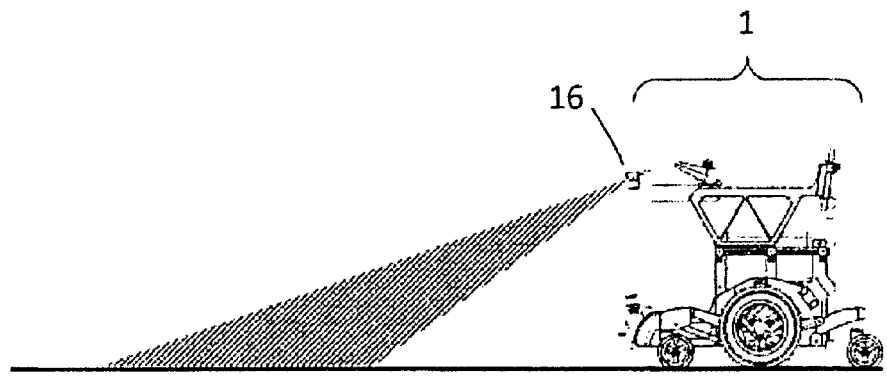
FIG. 16 is an illustration of a case where the sensing device is a camera or a three-dimensional sensing device (Embodiment 1)

The configuration of the sensing device and the traveling-route reflector in the present disclosure is described below with reference to FIGS. 6 and 7. FIG. 6 is a side view of the movable object in the present embodiment. The scanner-type laser distance sensor 4 is disposed at a front portion of the movable object 1, with the scanning surface thereof being directed diagonally downward with respect to the horizontal direction. The diagonally-downward directed sensor emits a laser 42 to an illumination point 44, which is distant from the scanner-type laser distance sensor 4 by a distance L in the traveling direction. The sensor outputs the distance to the illumination point 44 and the received-light intensity. The distant L to the illumination point 44 can be determined by the installation angle and height of the scanner-type laser distance sensor 4. For example, the scanner-type laser distance sensor 4 can be installed at 1 m from the ground so that the distance L to the illumination point 44 is set to be approximately 3 m. The distance L may be determined in accordance with the longest braking distance of the movable object 1. By setting the braking distance of the movable object 1 as the distance L, the movable object 1 can decelerate using a sufficient distance whenever a branch point or an intersection is detected. For example, FIG. 16 is a schematic view of a case where a camera capable of measuring received-light intensity or a three-dimensional scanner-type laser distance sensor is used. The sensing device 16 can measure a wide range of areas at the same time, thus being capable of more reliably detecting the traveling-route display means. A combination of multiple sensing devices may be used to detect multiple sections of the traveling-route display means.

Figure 7:
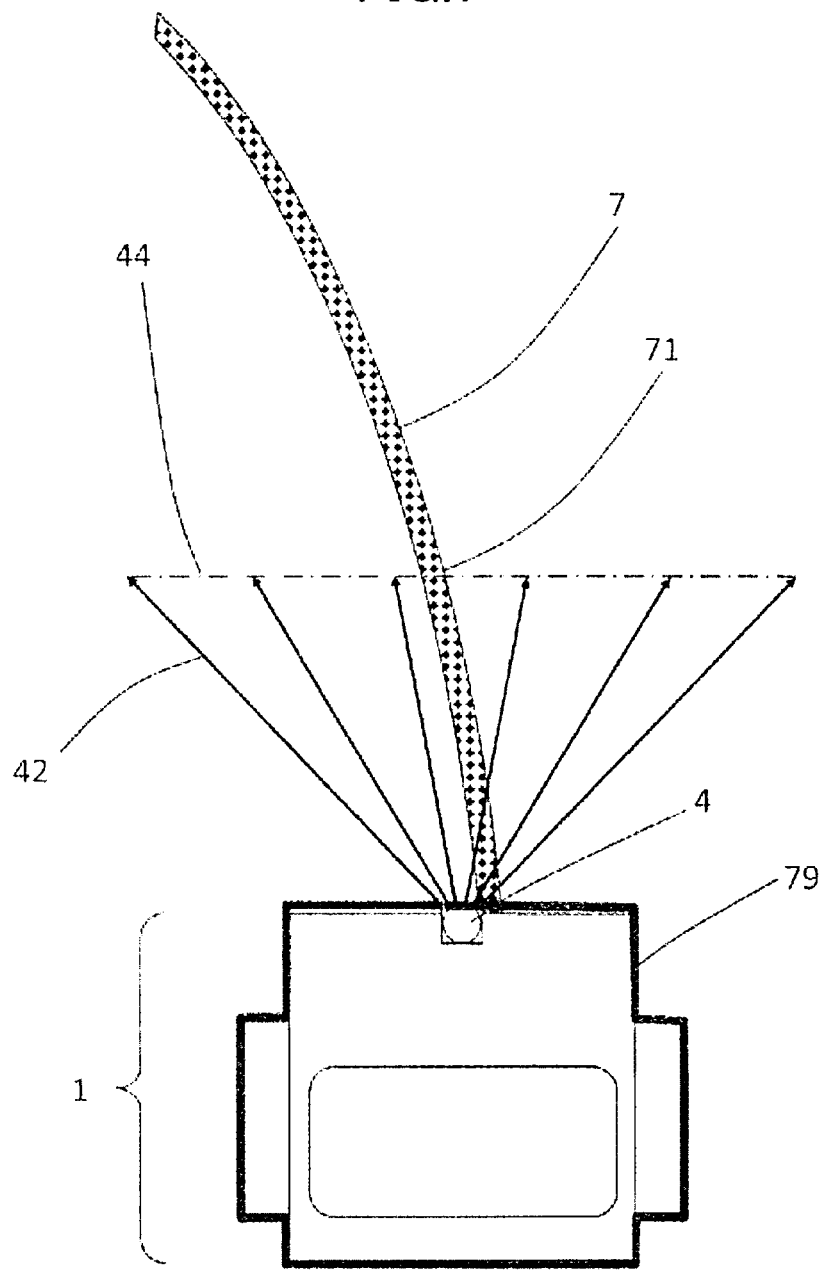
FIG. 7 is an illustration of a traveling route and detection performed by a sensing device (Embodiment 1)

FIG. 7 is a schematic top view of the movable object 1 and the traveling-route reflector 7. As shown in FIG. 7, the scanner-type laser distance sensor 4 installed at the front portion of the movable object 1 performs left-right scanning in the diagonally-downward direction. Thus the illumination point 44 moves side to side, and the distance and received-light intensity at the scanned point is transmitted successively. The bolded line 79 in FIG. 7 denotes a region that can be regarded as a floor projection region of the movable object 1. The illumination point 44 is located outside the floor projection region 79 and forward in the traveling direction of the movable object 1. The characteristic feature of the present embodiment is to detect the traveling-route reflector located forward in the traveling direction. In the present embodiment, the traveling-route reflector is a line 7 made of a retroreflective material. With the use of the retroreflective material, the received-light intensity at a detection point 71 on the line 7 is remarkably high, and thus the line 7 can be detected more reliably. The traveling-route reflector 7 may be provided by applying paint onto a travel surface or affixing an adhesive tape to a travel surface. Also, the traveling-route reflector 7 may be made of a band-like or tubular shape material, as shown in FIG. 14(a). Furthermore, the traveling-route reflector 7 may include multiple divided segments, as shown in FIG. 14(b). For example, the traveling-route reflector 7 may be disposed onto the travel surface or fastened with stakes or the like at an appropriate interval, so that the traveling-route reflector 7 can be removed from the travel surface and is attachable to the travel surface. This facilitates route change.

Figure 8:
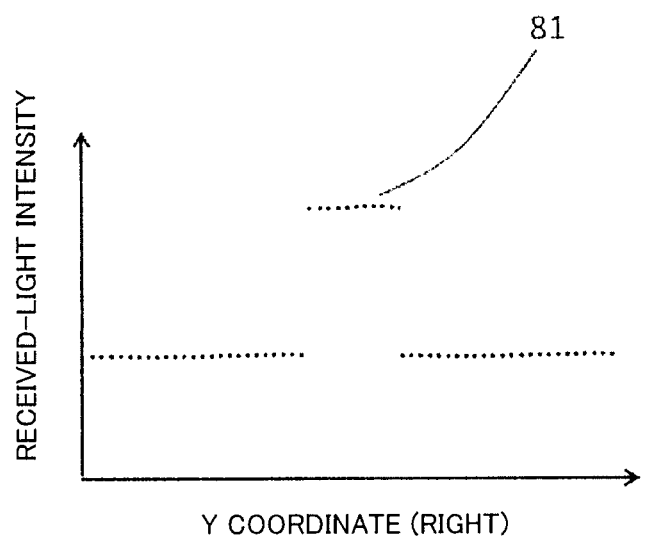
FIG. 8 is an illustration of intensity of received light and line detection by the scanner-type laser distance meter (Embodiment 1)

FIG. 8 illustrates a specific example of a detection method. The graph illustrated in FIG. 8 indicates the received-light intensity of a sequence of points scanned successively. The horizontal axis indicates a y coordinate of the illumination point 44 assuming that the traveling direction of the movable object is indicated by an x-axis and the right direction with respect to the traveling direction is indicated by a y-axis, and the vertical axis of the graph indicates the received-light intensity at each scanned point. The reference sign 81 in FIG. 8 denotes received-light intensities at scanned points near the detection point 71 on the line 7 illustrated in FIG. 7, and such received-light intensities are significantly high, indicating that the line 7 has been detected clearly. For example, coordinates of points each having a received-light intensity equal to or greater than a predetermined value may be averaged to obtain a coordinate of the detection point 71. Alternatively, only previous detection points that have been detected through previous scanning and are near the line 7 may be used for the calculation. If the received-light intensities of all scanned points are equal to or less than the predetermined value, it is determined that the line 7 cannot be detected. In the actual environment, detection by the sensing device 4 may fail due to degradation of the traveling-route reflector 7 and/or accumulation of contaminants and dirt on the traveling-route reflector 7. Thus if the detection cannot be performed over a predetermined linear traveling distance, actual route distance, or time period, the movable object 1 stops traveling or provides notification to another system through a device equipped with the movable object 1 or through communication. This enables the movable object 1 to reliably travel even when the traveling-route reflector 7 is partially not visible, as well as to suitably operate even when a certain or even worse level of failure occurs or even when the movable object 1 has completely lost sight of the traveling-route reflector 7.

Figure 9:
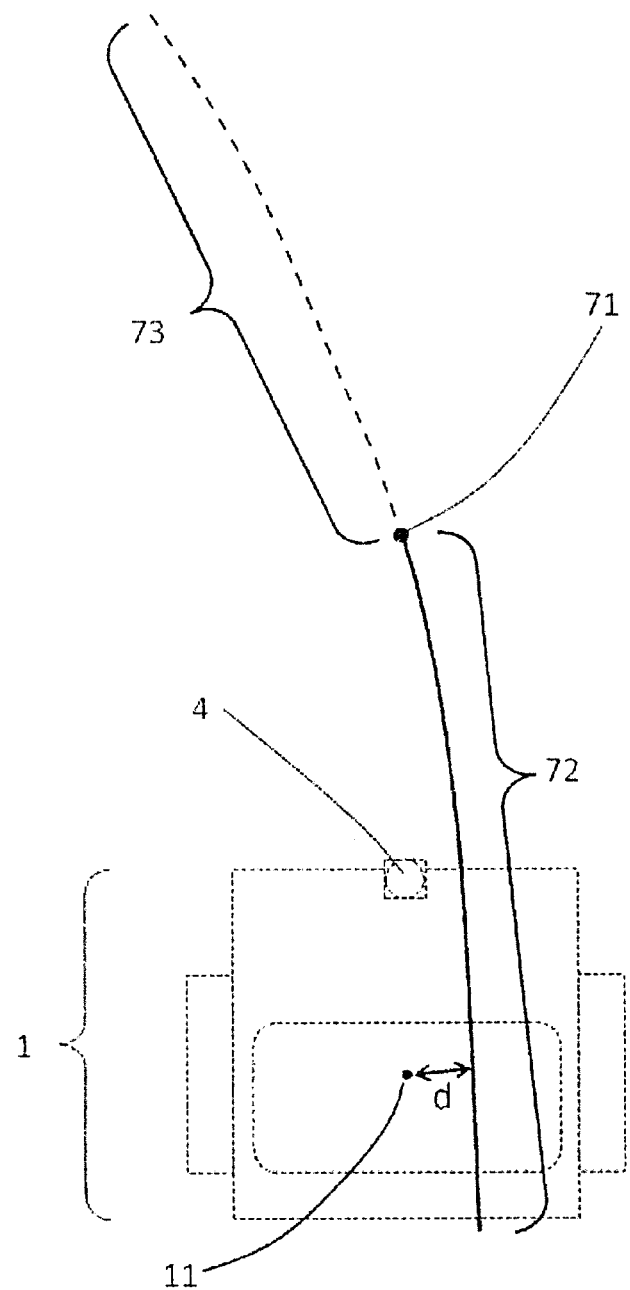
FIG. 9 is an illustration of traveling control for the movable object on a traveling route (Embodiment 1)

The scheme of controlling the movable object 1 based on information regarding the detected line 7 is described with reference to FIG. 9. FIG. 9 is a schematic top view of the movable object 1 and the traveling-route reflector 7. In the present embodiment, as the movable object 1 travels, coordinates of the detection points 71 detected by the scanner-type laser distance sensor 4 are stored as a sequence of points on a ground coordinate in chronological order, and are used for control. In FIG. 9 the detection point 71 is distant from the movable object 1, and thus the use of only one coordinate of the detection point 71 is insufficient to achieve control of route traveling. That is, only one coordinate of the detection point 71 does not provide sufficient information required to determine whether or not the movable object 1 is on the route. Thus, in this embodiment coordinates of previously-detected detection points 71 are stored, and route traveling control is performed based on the stored point sequence. The detection point 71 moves as the movable object 1 travels, and thus the coordinates of the previously-detected detection points 71 arranged in chronological order can be regarded as a sequence of points along the traveling-route display means. In FIG. 9, traveling control is performed by using the previously-detected point sequence 72 as the traveling-route display means. Also, even when the sensing device is a three-dimensional scanner type, the inside of the floor projection region of the movable object sometimes cannot be measured. Thus the use of the previously-detected point sequence 72 allows the movable object 1 to more precisely travel along the traveling-route reflector 7.

In FIG. 9 a representative point of the movable object 1 is indicated by the point 11. The representative point is, for example, regarded as the center of the movable object 1, and the movable object 1 is controlled so that the representative point 11 is positioned on the point sequence 72 or so that the distance d from the point sequence 72 to the representative point 11 is less than a predetermined value. For example, the rotation speed of the movable object 1 is determined based on the distance d so that the representative point 11 approaches the point sequence 72.

Figure 10:
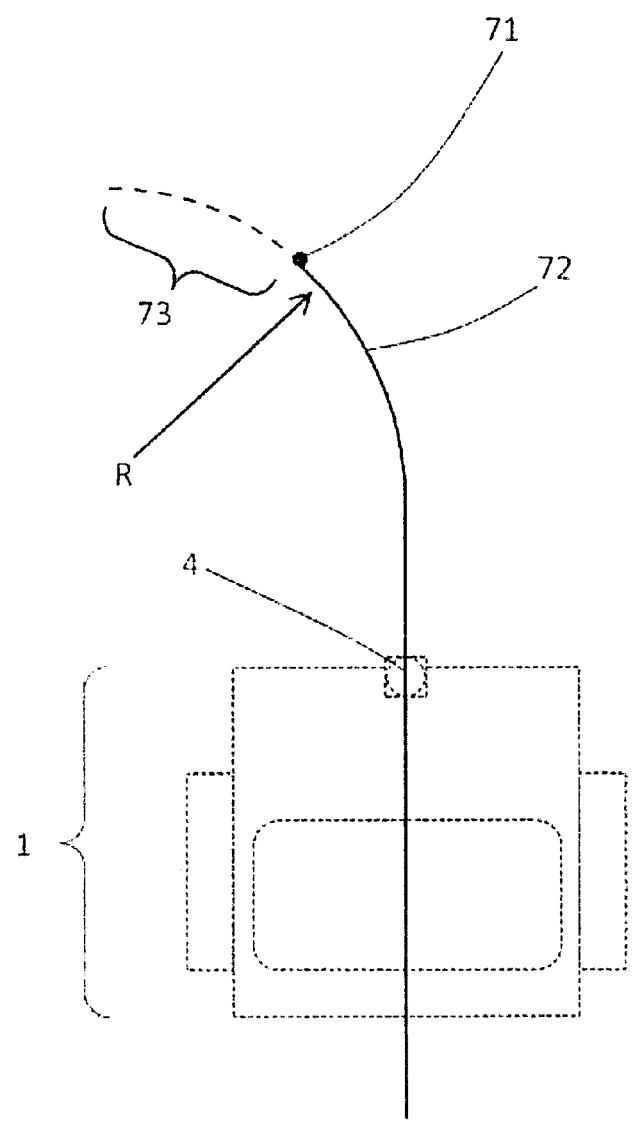
FIG. 10 is an illustration of traveling control performed when a curve is detected along the traveling route (Embodiment 1)

The translational speed of the movable object 1 may be controlled based on the curvature of the point sequence 72. For example, when a curve with a curvature R in the traveling direction is detected in the point sequence 72 illustrated in FIG. 10, the translational speed of the movable object 1 can be set based on the curvature R. When, in particular, the curvature R is great, the movable object 1 can decelerate prior to entering the curve and perform low-speed traveling around the curve. Thus, traveling control that improves ride comfort can be achieved. Also, the centrifugal force acting on the movable object can be calculated using the curvature R and the translational speed of the movable object 1. Thus the speed of the movable object may be controlled so that the centrifugal force does not exceed a predetermined value.

Figure 11:
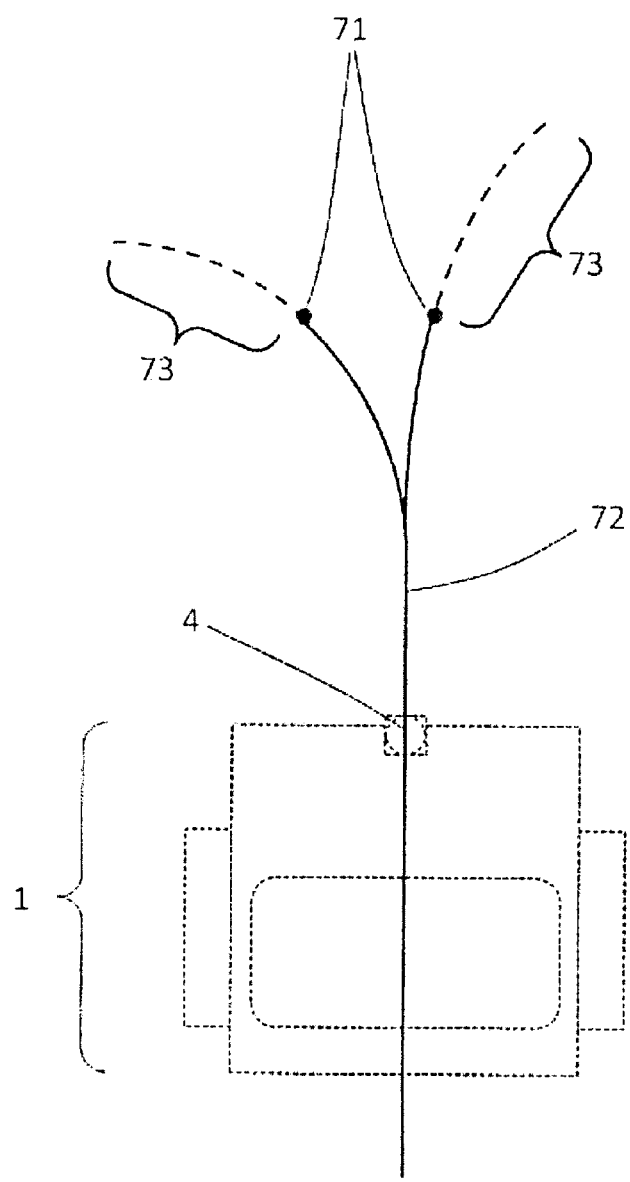
FIG. 11 is an illustration of traveling control performed when a branch point is detected along the traveling route (Embodiment 1)

The movable object 1 is configured to, when there is a branch point or intersection along the traveling route, detect such a branch point or an intersection in advance, decelerate or stop traveling, and notify the user of the branch point or the intersection to prompt the user to instruct which direction to proceed. As shown in FIG. 11, when there is a branch point along the traveling route, two or more detection points 71 are detected. The movable object 1 can be configured to, when it is determined that there are two or more detection points 71, decelerate and at the same time prompt the user to decide which direction of the branches to proceed. The user may be notified by, for example, voice guidance and/or screen display. The user can, for example, operate the joystick or a touchscreen to instruct the movable object which direction of the branches to proceed. The movable object 1 decelerates or stops traveling, and awaits the user's instruction on the traveling direction. Upon reception of the instruction, the movable object 1 starts to move and proceeds in the instructed direction. The notification that there is a branch point or an intersection may be provided to another system instead of the user. Another system may be, for example, an upper-level management system, an autonomous traveling control system, or the like, and the notification is transmitted through communication. Then the movable object 1 receives from the other system an instruction as to which direction to proceed after the branch point or the intersection, and travels along the route in the instructed direction. The movable object 1 may be configured to travel in the instructed direction without deceleration in a case of being able to immediately receive an instruction from the other system. The configuration described above allows the movable object 1 to perform route selection in cooperation with the user and another system in a route having a branch point or an intersection.

Figure 12:
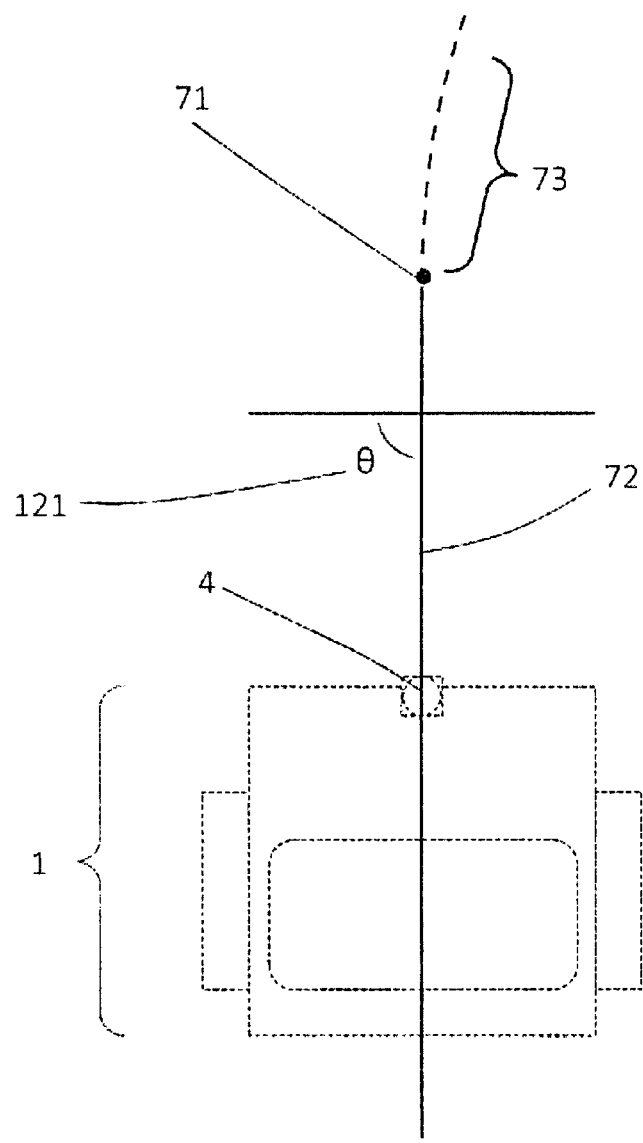
FIG. 12 is an illustration of traveling route performed when an intersection is detected along the traveling route (Embodiment 1)

FIG. 12 illustrates an example of a case where an intersection is detected along the traveling direction of the movable object 1. The movable object 1 may be configured to, when an intersection is detected along the route, notify the user of the intersection and proceed in the instructed traveling direction, similar to the above-described case where a branch point is detected. Alternatively, the movable object 1 may be configured to continue traveling along the route by disregarding the intersection if an intersection angle, formed by paths that are selectable due to the branch point or the intersection, is less than a predetermined value. For example, the movable object 1 may be configured to continue traveling along the route when, for example, two routes converge or two routes cross at right angles, that is, the angle 121 is 90 degrees as shown in FIG. 12. Thus the movable object 1 continues to travel along the route by disregarding a branch point or an intersection that forms an angle less than a predetermined angle. Such a configuration allows easy creation of a traveling route with a clear differentiation between an intersection that the movable object 1 can disregard thereby continuing to travel along the route, and an intersection that the movable object 1 recognizes as an intersection and prompts the user to determine which direction to proceed.

As described above, in the present embodiment a region outside the floor projection region of the movable object 1, in particular the traveling-route reflector disposed on the ground in the forward direction is detected. Thus traveling can be controlled based on traveling route information regarding the traveling direction of the movable object 1. This provides an autonomous movement system with improved ride comfort. For example, traveling control, such as gradual deceleration prior to entering a curve as described in FIG. 10, speed regulation based on the turning radius so that the centrifugal force is not too great, and the like, can be achieved. Furthermore, the movable object 1 can detect a branch point or an intersection in advance, decelerate, and then notify the user to prompt the user to instruct which direction to proceed. Furthermore, for a movable object that autonomously travels with an item loaded thereon, an autonomous movement system for achieving reliable traveling can also be provided.

Figure 13:
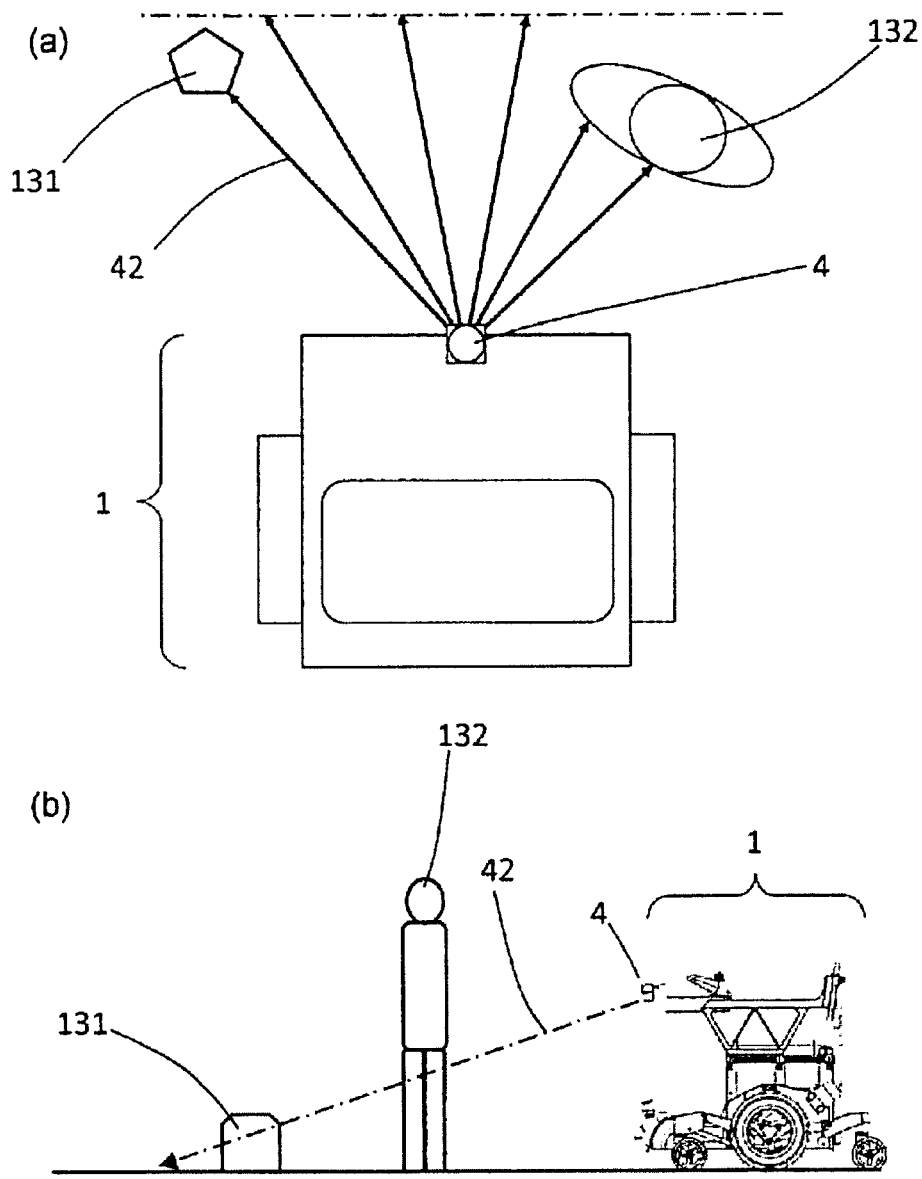
FIG. 13 is an illustration regarding detection of ground unevenness and a pedestrian (Embodiment 1)

Moreover, in addition to detecting the traveling-route display means, the single sensing device can also detect any other objects therearound and the state of a travel surface. The scanner-type laser distance sensor 4 employed in the present embodiment can detect the distance from a detected object. Such a feature can be used to detect unevenness on a travel surface, other pedestrians, and movable objects such as cars. FIG. 13(a) is a schematic top view of the movable object 1 of the present embodiment, and FIG. 13(b) is a schematic side view. With a configuration similar to that illustrated in FIGS. 6 and 7, the distance calculated by the laser emitted to the unevenness 131 on the ground can be used to detect something present on the ground and also detect the relative position with respect to the detected object. Similarly, a pedestrian 132 can also be detected using the distance information. When the detected unevenness on the ground or the detected pedestrian is determined to obstruct the traveling of the movable object 1, the movable object 1 can stop traveling or bypass such an obstruction. As such, both the traveling route and obstructions such as unevenness on the ground, pedestrians, and the like, can be detected with a single sensing device. Thus the number of expensive sensing devices can be accordingly suppressed, and this would expectedly result in cost reduction.

In the conventional technology that uses a combination of a magnetic tape and a magnetic sensor, it is necessary to arrange the magnetic tape and the magnetic sensor sufficiently close to each other, and thus traveling-route reflector cannot be detected when the traveling-route reflector is distant from the movable object. Furthermore, when a specific colored line is attempted to be detected with a camera or the like, the detection may fail or result in an erroneous detection due to direct sunlight being reflected on the line or a similar-colored object near the line. In the present embodiment, a combination of the line 7 made of a retroreflective material and the scanner-type laser distance sensor 4 is used, and a laser is emitted to detect the received-light intensity. Such a configuration allows reliable detection of the traveling-route reflector in the traveling direction of the movable body, without being affected by a change in the environment. Also, advantageous effects of the present disclosure can partially be obtained by employing a configuration in which the traveling-route reflector is represented by color information, and a sensing device such as camera or the like that can acquire the color information is used.

Figure 15:
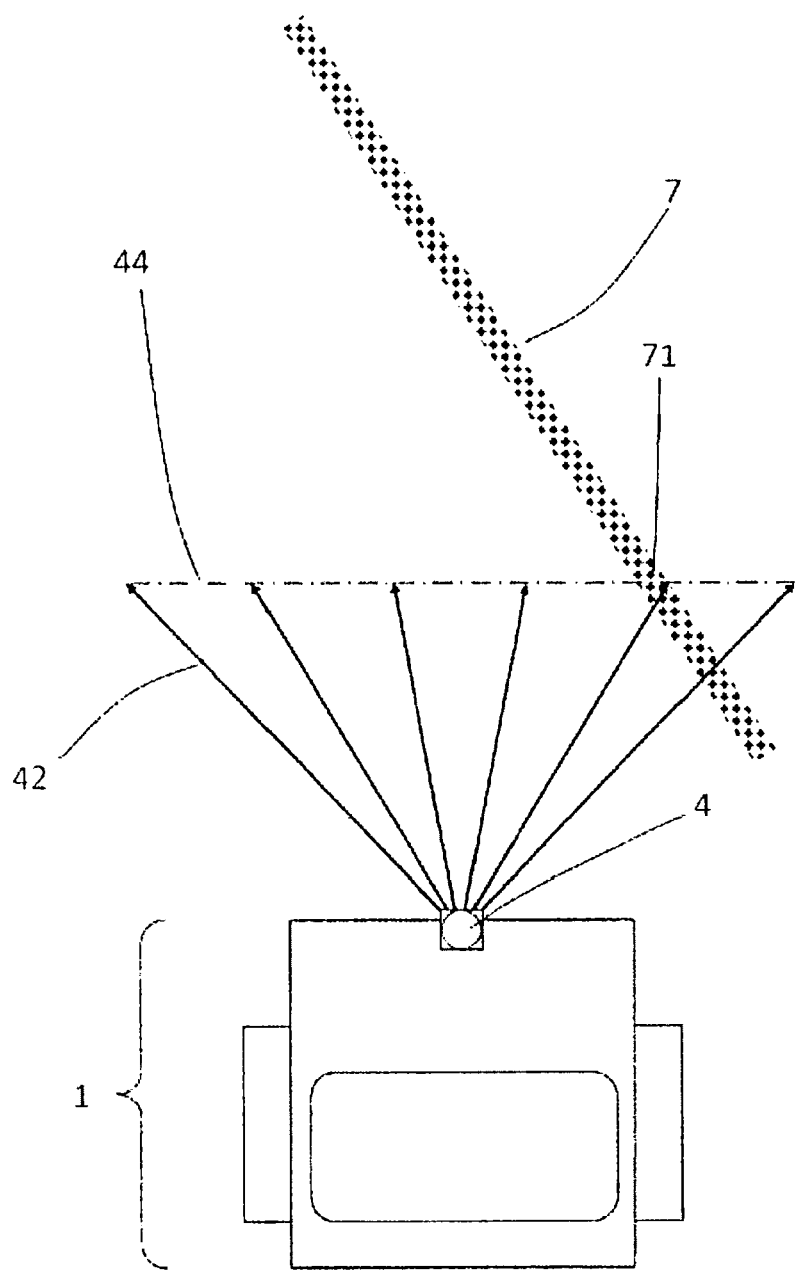
FIG. 15 is an illustration of control performed when a traveling route is detected at the start of traveling (Embodiment 1)
Figure 17:
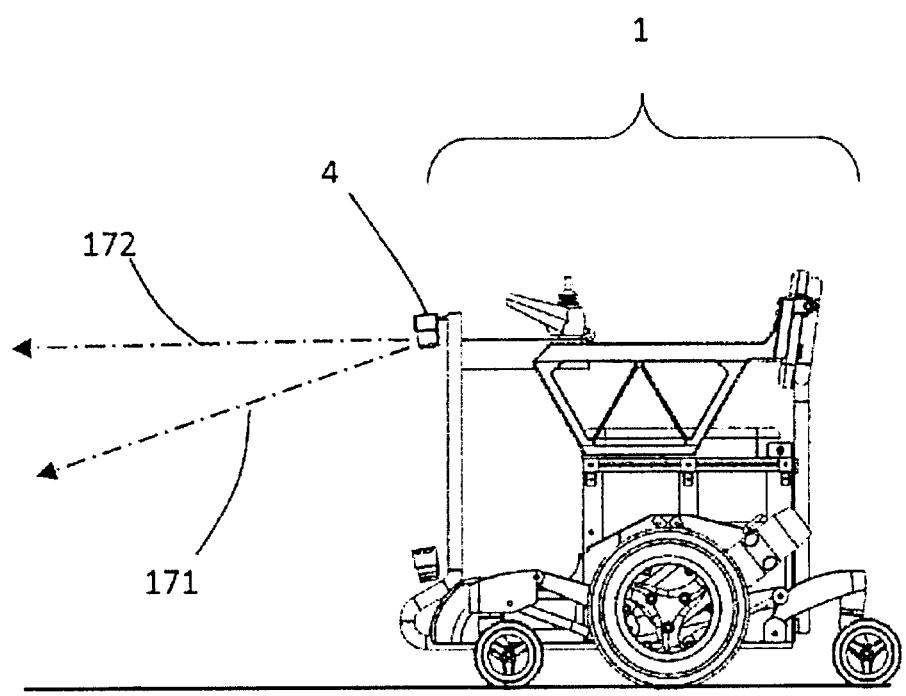
FIG. 17 is an illustration relating to a mechanism for varying an installation angle of the sensing device.

Furthermore, a configuration may be employed in which, when the movable object 1 is not traveling along the traveling-route reflector 7, the sensing device 4 detects the traveling-route reflector 7 and then notifies the user or another system that the movable object 1 can start traveling along the traveling-route reflector 7. For example, when the movable object 1 is traveling through the user's manipulation, upon the scanner-type laser distance meter 4 detecting the line 7 as shown in FIG. 17, a notification may be provided to the user and then the user-controlled traveling may be switched to the autonomous route traveling along the line 7 in accordance with the user's instruction. This facilitates switching from traveling by another temporary scheme to traveling along the traveling-route reflector 7. Also, input means for instructing a start of traveling may be provided, and at the start of traveling based on the input means, when the scanner-type laser distance meter 4 detects the traveling-route reflector 7 and then the movable object 1 and the traveling-route reflector 7 are determined to have a predetermined positional relationship, the movable object 1 can start traveling along the traveling-route reflector 7. Specifically, as shown in FIG. 15, the scanner-type laser distance meter 4 detects the line 7, and when the angle between the line 7 and the traveling direction of the movable object 1 is determined to be equal to or less than a predetermined value, the movable object 1 can start traveling so as to merge into the route indicated by the line 7. In contrast, a configuration may be employed in which if the line 7 cannot be detected, the movable object 1 travels by another scheme or does not start traveling. This enables automatic selection regarding whether to start traveling along the traveling-route reflector 7 or to travel with another scheme depending on the environment, or easy determination that traveling along the traveling-route reflector 7 cannot begin.

In the above configuration the sensing device 4 is installed at a fixed angle. However, a mechanism allowing the installation angle to be variable may be provided, and a function that can detect the installation angle of the sensing device may further be provided. As shown in FIG. 17, when the scanner-type laser distance meter 4 is installed so as to be directed diagonally downward as described above, the laser is emitted in a direction indicated by the reference sign 171. In contrast, with a mechanism allowing the installation angle to be variable, the laser can be emitted in the horizontal direction as indicated by a reference sign 172. The movable object 1 may be configured such that, when the laser emission direction is the direction 171, the movable object 1 travels along the route by detecting the traveling-route reflector as described above, and when the laser emission direction is the direction 172, the movable object 1 travels autonomously based on, for example, a map stored in the movable object 1 by associating the map with measured environment. For configuring the installation angle of the scanner-type laser distance meter 4 to be variable, the movable object 1 can be provided with detection means for detecting the installation angle of the scanner-type laser distance meter 4. Examples of the installation-angle detection means include a mechanical switch, which may be configured to be switched on upon the scanner-type laser distance meter 4 being moved to a predetermined position. The movable object 1 may be configured to travel along the traveling-route reflector when, for example, the sensing device is directed diagonally downward, and to autonomously travel based on an environment map or follow a moving object when the sensing device is directed in the horizontal direction. Such a configuration allows selection of a traveling scheme from among multiple schemes and change of the orientation of the sensor to be easily performed at the same time.

A movable object according to the present disclosure that autonomously travels along a predetermined route, transporting a person or an item thereon, may be applied to play structures in theme parks, item conveyance within factories and in agricultural lands, smart technologies, and the like.

The invention claimed is:

1. An autonomous movement system allowing a movable object to travel autonomously, the autonomous movement system comprising:
    a sensing device installed on the movable object, the sensing device to detect traveling-route reflector from a region outside a floor projection region of the movable object, the traveling-route reflector being arranged on a travel surface, wherein
    based on the traveling-route reflector detected by the sensing device, the autonomous movement system controls the movable object so that the movable object travels along the traveling-route reflector, and
    the traveling-route reflector comprises a retroreflective material, thereby reflecting light in an incident direction, and
    the sensing device is a scanner-type laser distance meter that comprises a light emitter and a light receiver.

2. The autonomous movement system according to claim 1, wherein
    the traveling-route reflector has a band-like shape or a tubular shape and is detachably attachable to the travel surface.

3. The autonomous movement system according to claim 1, wherein
    the sensing device further detects ground unevenness and an object on the travel surface, in addition to the traveling-route reflector.

4. The autonomous movement system according to claim 1, wherein
    the movable object detects, during traveling, a branch point or an intersection along the traveling-route reflector through the sensing device, and performs a predetermined operation or provides a notification prior to reaching the branch point or the intersection.

5. The autonomous movement system according to claim 1, wherein the movable object detects, during traveling, a branch point or an intersection along the traveling-route reflector through the sensing device, decelerates or stop traveling at a predetermined position prior to reaching the branch point or the intersection, notifies a user or another system of information relating to the branch point or the intersection, and travels along the traveling-route reflector based on selection by the user or the other system as to which direction to proceed.

6. An autonomous movement system allowing a movable object to travel autonomously, the autonomous movement system comprising:
   a sensing device installed on the movable object, the sensing device to detect traveling-route reflector from a region outside a floor projection region of the movable object, the traveling-route reflector being arranged on a travel surface, wherein
   based on the traveling-route reflector detected by the sensing device, the autonomous movement system controls the movable object so that the movable object travels along the traveling-route reflector, and
   the movable object detects, during traveling, a branch point or an intersection along the traveling-route reflector through the sensing device, and when a path, from among multiple paths that are selectable because of the branch point or the intersection, forms an angle less than a predetermined angle with respect to a currently-traveling route, the movable object does not select the path as a traveling direction.

7. The autonomous movement system according to claim 1, wherein
   when the traveling-route reflector is not detected by the sensing device over a predetermined linear traveling distance, actual traveling distance, or a time period, the autonomous movement system performs a predetermined operation or provides a notification.

8. The autonomous movement system according to claim 1, wherein
   when the movable object is not traveling along the traveling-route reflector, the sensing device detects the traveling-route reflector and then notifies a user or another system that start of traveling along the traveling-route reflector is possible.

9. An autonomous movement system allowing a movable object to travel autonomously, the autonomous movement system comprising:
   a sensing device installed on the movable object, the sensing device to detect traveling-route reflector from a region outside a floor projection region of the movable object, the traveling-route reflector being arranged on a travel surface, wherein
   based on the traveling-route reflector detected by the sensing device, the autonomous movement system controls the movable object so that the movable object travels along the traveling-route reflector, and
   the autonomous movement system further comprises installation angle detection means for detecting an installation angle of the sensing device, wherein the autonomous movement system selects whether or not to travel along the traveling-route reflector based on the installation angle detected.

10. The autonomous movement system according to claim 1, further comprising input means for instructing start of traveling, wherein
    at start of traveling based on the input means, when the sensing device detects the traveling-route reflector, and the movable object and the traveling-route reflector are determined to have a predetermined positional relationship, the autonomous movement system selects to start traveling along the traveling-route reflector, and
    at start of traveling based on the input means, when the sensing device detects the traveling-route reflector, and the movable object and the traveling-route reflector are determined not to have the predetermined positional relationship, the autonomous movement system selects to travel using another scheme or selects not to start traveling.

11. The autonomous movement system according to claim 1, further comprising a plurality of the sensing devices installed on the mobile object.

* * * * *